United States Patent [19]

Harris et al.

[11] Patent Number: 4,681,924

[45] Date of Patent: Jul. 21, 1987

[54] CATALYST SYSTEMS FOR POLYMERIZATIONS AT HIGH TEMPERATURES

[75] Inventors: James J. Harris; Donald E. Hostetler; G. Stanley Achorn, all of West Chester, Pa.

[73] Assignee: National Distillers and Chemical Corporation, New York, N.Y.

[21] Appl. No.: 454,224

[22] Filed: Dec. 29, 1982

[51] Int. Cl.$^4$ .................... C08F 4/64; C08F 210/02
[52] U.S. Cl. .................... 526/125; 502/134; 526/155; 526/156; 526/348.2; 526/904
[58] Field of Search .................................. 526/125

[56] References Cited

U.S. PATENT DOCUMENTS

| | | | |
|---|---|---|---|
| 3,010,787 | 11/1961 | Tornqvist | 23/87 |
| 4,130,503 | 12/1978 | Fodor | 526/125 |
| 4,146,502 | 3/1979 | Yokoyama et al. | 252/429 B |
| 4,149,990 | 4/1979 | Giannini et al. | 252/429 B |
| 4,347,158 | 8/1982 | Kaus et al. | 526/125 |
| 4,349,648 | 9/1982 | Jorgensen et al. | 526/125 |
| 4,354,010 | 10/1982 | Newton | 526/122 |

FOREIGN PATENT DOCUMENTS 3027885  2/1981  Fed. Rep. of Germany ...... 526/125

*Primary Examiner*—Edward J. Smith
*Attorney, Agent, or Firm*—Kenneth D. Tremain

[57] ABSTRACT

Copolymerization of ethylene and a $C_3$–$C_{20}$ alpha-monoolefin at high temperature gives a low density polyethylene having a density of between 0.91 and 0.93 g/cc. The copolymerizations are accomplished with a catalyst made by co-comminuting an anhydrous magnesium halide, an anhydrous aluminum halide, a titanium compound, and at least one electron donor, and a cocatalyst comprising a synergistic mixture of an alkyl aluminum chloride and an oxygen-containing aluminum compound having oxygen attached to at least one aluminum valence.

13 Claims, No Drawings

CATALYST SYSTEMS FOR POLYMERIZATIONS AT HIGH TEMPERATURES

BACKGROUND OF THE INVENTION

The invention relates to a method of copolymerizing ethylene and up to 50 weight percent of an alphamonoolefin at temperatures between 200° C. and 300° C. under pressures up to 50,000 psig for a time of less than 10 minutes to produce low density polyethylene having a density of between 0.91 and 0.93 g.cc.

Tornquist, U.S. Pat. No. 3,010,787, relates to a method of preparing crystalline titanium catalyst by intensive grinding of a mixture of finely divided aluminum powder with titanium tetrachloride. This catalyst was used for low temperature polymerization of propylene.

Yokoyama et al, U.S. Pat. No. 4,146,502, teaches a catalyst component made by grinding a magnesium halide, an electron donor compound, and a titanium halide and then treating the resulting mixture with an interhalogen compound, such as iodine trichloride. The resulting component was used with an alkyl aluminum component to polymerize propylene at temperatures of between 30° and 120° C.

Giannini et al, U.S. Pat. No. 4,149,990, teaches the preparation of a catalyst component comprising magnesium halide, an electron donor having a reactive hydrogen atom, a titanium halide, and an electron donor free of reactive hydrogen atoms for use in polymerizing propylene at temperatures between 0° and 150° C.

Kaus et al, U.S. Pat. No. 4,347,158, teaches the use of at least two electron donors with a magnesium halide and an aluminum halide to polymerize propylene at 70° C. and low pressures.

Jorgensen et al, U.S. Pat. No. 4,349,648, teaches the use of a catalyst comprised of a magnesium compound, a titanium compound, an electron donor and a cocatalyst consisting of alkyl aluminum compound to continuously prepare ethylene copolymer in gas phase at temperatures between 30° and 105° C. and a pressure not greater than 1000 psig.

None of the above references teach how to copolymerize alpha olefins with ethylene to prepare linear low density polyethylene at high temperature (>200° C.) and pressures (to 50,000 psig).

SUMMARY OF THE INVENTION

We have now found that by the use of certain catalyst components in combination with certain cocatalyst combinations, low density polyethylenes having a density between 0.91 and 0.93 g/cc. can be prepared at a temperature of between 200° C. and 300° C. under pressures of up to 50,000 psig in short periods of time and with high catalyst efficiency.

DETAILED DESCRIPTION OF THE INVENTION

This invention comprises a method of preparing low density polyethylene having a density of between 0.91 and 0.93 grams per cubic centimeter comprising copolymerizing ethylene with from 1 to 50 per cent by weight of an alpha-monoolefin comonomer having 3 to 20 carbon atoms, said copolymerization being carried out at a temperature between 200° and 300° C. at pressures up to 50,000 psig for times less than 10 minutes in the presence of (a) a catalyst prepared by
  (i) co-comminuting a mixture of an anhydrous magnesium halide, ahhydrous aluminum halide and a first electron donor and
  (ii) co-comminuting the mixture from (i) with a complex of a titanium compound and a second electron donor, which may be different from or the same as said first electron donor; said co-comminuting being carried out under an inert atmosphere in the presence of an inert solvent, and (b) a co-catalyst comprising a synergistic mixture of between 40 to 80 mole percent of an alkyl aluminum chloride and 20 to 60 mole percent of an oxygen-containing aluminum compound having oxygen attached to at least one aluminum valence.

The low density polyethylenes of the present invention are actually copolymers of ethylene with alphamonoolefins having from 3 to 20 carbon atoms. The preferred comonomers are monoolefins, such as butene-1, 3-methylbutene-1, 4-methylpentene-1, octene-1, and dodecene-1. Normal amounts of comonomer to produce the desired density of between 0.91 and 0.93 g/cc. will be less than 15 mole per cent based on total monomer. A lower molecular weight comonomer, such as butene-1 will require less weight per cent comonomer than the longer chain, more expensive alpha-olefins such as octene-1, and thus it may be economically advantageous to use butene-1 as comonomer.

The catalyst is prepared by co-comminuting a magnesium halide, an aluminum halide, a titanium compound and at least one electron donor. The co-comminution is carried out preferably in a ball mill or vibration mill.

The magnesium halide is chosen from the chlorides, bromides and fluorides, with magnesium chloride being preferred. The magnesium compound must be anhydrous. Anhydrous magnesium chloride may be prepared by any of the known methods in the art. For example, it may be made by adding anhydrous HCl to an organomagnesium compound or by drying commercial $MgCl_2$ by heating to 350° C. in a stream of anhydrous HCl.

The aluminum halide is also chosen from the chlorides, bromides and fluorides.

The titanium compound may be halides, oxyhalides, alcoholates such as the titanates of aliphatic alcohols having 1 to 6 carbon atoms in the alkyl groups, acetates, benzoates, acetylacetonates and the dicyclopentadienyl salts. Especially useful are the halides such as titanium tetrachloride.

The electron donors are preferably aromatic ethers, such as anisole, or alkyl esters of aromatic acids, such as ethyl benzoate or ethyl p-toluate.

The preferred catalyst in this invention is made by first co-comminuting magnesium chloride, aluminum chloride and anisole followed by co-comminuting the above mixture further with a complex of titanium tetrachloride and ethyl benzoate. The ratio of Mg:Al is preferably between 2:1 and 16:1. The ratio of Mg:anisole is preferably between 2:1 and 16:1, also. The ratio of Mg:Ti is preferably between 8:1 and 80:1. The second electron donor should be used in essentially the same ratios as the anisole is used. Of course, the second electron donor may be anisole also, but it is preferably ethyl benzoate.

The ball milling of the magnesium halide, aluminum halide and the anisole is carried out under an inert atmosphere at temperatures between 0° C. and 90° C. for a time between 15 minutes and 48 hours.

The product of the first ball milling is then combined with the complex of titanium compound with a second electron donor and the whole ball milled under an inert atmosphere at a temperature between 0° C. and 90° C. for a time between 15 minutes and 48 hours.

Although it is preferred that all the above ingredients be ball milled in the absence of a solvent, a small amount of an inert solvent may be added and further ball milled to provide a uniformly disperse catalyst. Such inert solvents may be n-heptane, mineral spirits, and the like.

Although the dry catalyst produced by the ball milling described above may be used as such for polymerizations, it is often advantageous to disperse the catalyst in an inert solvent to facilitate handling, aid in preventing air contact, and in feeding the catalyst to the polymerization reactor. The catalyst may be dispersed in solvents such as hexane or mineral spirits by adding the solvent to the ball mill or by adding the catalyst to the solvent in a stirred vessel. It is preferred to use a stirrer capable of giving high shear dispersion.

In some cases the catalyst so produced has a disadvantage in that the dispersion of catalyst in inert solvent quickly separates on standing. This may make metering the catalyst, into a polymerization reactor difficult unless some means of continuously mixing the dispersion is used.

In some instances it may be convenient to further disperse the catalyst by adding a small amount of a monomer which will give a soluble polymer. This socalled "preactivation" of the catalyst actually polymerizes the monomer onto the surface of the catalyst to form a soluble polymer thereon. The preactivation is carried out in the presence of a small amount of cocatalyst, which may be the same co-catalyst to be used later in the intended polymerization. The preactivated catalyst is a more stable dispersion. It will settle more slowly and can be metered more efficiently than the initial catalyst dispersion. Preactivation of the catalyst may also increase the catalyst efficiency with regard to polymer yield per gram of catalyst.

The catalyst thus produced is used in conjunction with a cocatalyst comprising a synergistic mixture of between 40 to 80 mole percent of an alkyl aluminum chloride and 20 to 60 mole percent of an oxygen-containing aluminum compound having oxygen attached to at least one aluminum valence. The oxygen-containing aluminum compounds alone give essentially no polymer. The alkyl aluminum chlorides alone give less than 20,000 grams of polyethylene per gram of titanium in the catalyst and requires excess amounts of comonomer to give a density in the desired range. The alkyl aluminum chloride is selected from dialkyl aluminum chloride, alkyl aluminum dichloride, and mixtures of these. The oxygen-containing aluminum compound may be aluminum oxide, but is preferably an alkyl aluminum compound such as dialkyl aluminum alkoxide, alkyl aluminum dialkoxide, aluminum trialkoxide, or the various aluminoxanes, such as tetraalkyldialuminoxane, pentaalkyltrialuminoxane and hexaalkyltetraaluminoxane. In all cases, the "alkyl" refers to linear or branched alkyl groups having 1 to 10 carbon atoms in the group. The cocatalyst is used generally in ratios from 1:1 to 100:1 based on the titanium content of the catalyst.

The low density polyethylenes of the present invention are prepared by polymerization at temperatures between 200° and 300° C. and at pressures up to 50,000 psig. At lower pressures (to 5000–10000 psig) it may be desirable to use an inert solvent to dissolve the polymer giving a solution polymerization. In some cases the comonomer will serve this function and additional solvent is not needed. The inert solvent suitable for such use may be an inactive hydrocarbon such as isobutane, butane, pentane, hexane, n-heptane, cyclohexane, or mineral spirits. At higher pressures the alpha-olefin-/ethylene mixture will generally suffice as the polymerizing medium even with a low molecular weight comonomer such as butene-1. It is especially advantangeous to run the polymerizations in the absence of solvent since removal of solvent will not be required.

The use of the instant catalyst/co-catalyst combination at the temperatures and pressures indicated allows the high efficiency production of ethylene copolymers in extremely short residence times. Thus, where most catalyst combinations require at least 1 hour polymerization time to produce a high yield of polymer, the instant system produces catalyst efficiencies of greater than 20,000 grams of polyethylene per gram of titanium in less than 10 minutes, and as little as 0.6 minutes in some instances. This short residence time is highly desirable in continuous polymerization processes.

The following examples are intended to further illustrate, but not to limit the scope of the instant invention.

EXAMPLE I a. Catalyst Preparation:

Magnesium chloride is dried by heating it to 365° C. while anhydrous HCl is passed over it. The anhydrous $MgCl_2$ thus formed (40 g) is charged in Argon to a ball mill containing 316 stainless steel balls with 7.0 g anhydrous $AlCl_3$ and 11.0 g anisole. The mixture is ball milled for 30 hours and then 10 g of a preformed titanium tetrachlorideethyl benzoate complex, $TiCl_4/EB$, in 10 g hexane is added. Ball milling is continued an additional 24 hours under a blanket of Argon. Then 50 ml. additional hexane is added and the mixture is ball milled for 6 hours to produce a fine slurry. The mixture is further diluted with mineral spirits to the desired concentration for use in the subsequent polymerizations.

b. Preparation of Low Density Polyethylene:

A one gallon stirred autoclave jacketed with a circulating oil bath is charged with 1.6 liters of mineral spirits (Exxon Isopar H) and 350 ml. of octene-1 comonomer under a blanket of nitrogen. The contents are then heated to 240° C. and the reactor is charged to 600 psig with ethylene.

A 1.5 ml. sample of the catalyst, from 1a, containing 0.048 millimoles (mm) of titanium and 1.25 mm diethyl aluminum chloride (DEAC) are mixed in a 20 ml. catalyst tube and flushed into the reactor with 50 ml. of Isopar H (preheated to 150° C.). Polymerization begins immediately. After 40 seconds at the desired polymerization temperature the reactor contents are discharged into a vessel containing 1 liter of isopropyl alcohol at atmospheric pressure. The resulting slurry is cooled to below 50° C. and filtered. The filter cake is mixed with acetone in a Waring blender, filtered and then vacuum dried to constant weight. Results are shown in Table I.

The melt index values, $MI_2$ and $MI_{10}$ are determined at 190° C. by ASTM D1238 (Condition E and N respectively). Polymer densities are obtained on compression molded film samples conditioned for 1 hour in boiling water using a density gradient column (ASTM D1505).

The same procedure and the same Ti catalyst is used in several polymerizations wherein the DEAC is replaced by a mixture of DEAC and diethyl aluminum ethoxide (DEAEO) as cocatalyst. Again, the results are shown in Table I.

TABLE I

| Co-Catalyst | polymer Yield, g. | Catalyst Efficiency g PE/g Ti | Melt MI$_2$ | Index MI$_{10}$ | Density, g/cc. |
|---|---|---|---|---|---|
| DEAC | 39.5 | 16,000 | 7.0 | 114.0 | 0.929 |
| 3DEAC/ 1DEAEO | 74.2 | 31,600 | 7.4 | 85.0 | 0.918 |
| 2DEAC/ 1DEAEO | 65.2 | 27,780 | 2.3 | 50.8 | 0.918 |
| 1DEAC/ 1DEAEO | 109.8 | 46,700 | 6.4 | 90.0 | 0.919 |
| 1DEAC/ 2DEAEO | 0 | — | — | — | — |
| DEAEO | 0 | — | — | — | — |

Thus, it can be seen from Table I, the use of DEAC alone as cocatalyst in this system gives low catalyst efficiency and higher densities. Although DEAEO alone does not give any polymer, the combination of DEAC and DEAEO in mole ratios between 40/60 and 80/20 DEAC/DEAEO acts synergistically to give high yields and low densities.

EXAMPLE II a. Catalyst Preparation:
The catalyst is prepared by the method of Example 1a.

b. Preactivation of Catalyst
A portion of the catalyst from part (a) containing 0.8 mm Ti in 25 ml Isopar H is added to a 100 ml Diels-Alder pressure tube under nitrogen and then sealed with a perforated bottle cap having a neoprene rubber liner. To this is charged by syringe with stirring (magnetic stirrer) 0.5 mm TOA and 4.0 ml octene-1 (80 g octene-1/g Ti). The catalyst is agitated for a minimum of 24 hours before use.

c. Polymerization of Ethylene:
The preactivated catalyst from part (b) is used in the polymerization of ethylene and octene to prepare low density polyethylene as in Example Ib except that catalyst containing 0.09 mm Ti was used with 1.5 mm of a 2/1 mixture of DEAC/DEAEO. The results are shown in Table II. A comparison run using a non-preactivated catalyst from part (a) containing 0.048 mm Ti is shown in the Table II, also.

TABLE II

| Run | Polymerization Temp. | Polymer Yield, g. | Catalyst Efficiency gPE/g.Ti | Melt MI$_2$ | Index MI$_{10}$ | Density g/cc. |
|---|---|---|---|---|---|---|
| Ex II | 254 | 78.7 | 18,300 | 66.0 | — | 0.905 |
| Control | 240 | 65.2 | 27,700 | 2.3 | 50.8 | 0.918 |

An advantage of the preactivation process is the increased stability of the catalyst slurry resulting from the preactivation. This stability contributes to the ease of metering the catalyst slurry and to the uniformity of the slurry.

What is claimed is:

1. A method of preparing low density polyethylene having a density of between 0.91 and 0.93 grams per cubic centimeter comprising copolymerizing ethylene with from 1 to 50 percent by weight of an alpha-monoolefin comonomer having 3 to 20 carbon atoms, said copolymerization being carried out at a temperature between 200° C. and 300° C. at pressure up to 50,000 psig in the presence of
    (a) a catalyst prepared by
        (i) co-comminuting a mixture of an anhydrous magnesium halide, anhydrous aluminum halide and a first electron donor, and
        (ii) co-comminuting the mixture from (1) with a complex of a titanium compound and a second electron donor, which may be different from or the same as said first electron donor; said co-comminuting being carried out under an inert atmosphere in the presence of an inert solvent, and
    (b) a co-catalyst comprising a synergistic mixture of between 40 to 80 mole percent of an alkyl aluminum chloride and 20 to 60 mole percent of an oxygen-containing aluminum compound selected from the group consisting of aluminum oxide, dialkyl aluminum alkoxide, alkyl aluminum dialkoxide, aluminum trialkoxide, tetraalkyldialuminoxane, pentaalkyltrialuminoxane, and hexaalkyltetraaluminoxane, wherein alkyl may be linear or branched alkyl groups having 1 to 10 carbon atoms in the group.

2. The method of claim 1 wherein said copolymerization is carried out for a time less than 10 minutes.

3. The method of claim 1 wherein said cocatalyst consists of a synergistic mixture of between 40 to 80 mole percent of diethyl aluminum chloride and 20 to 60 mole percent of diethyl aluminum ethoxide.

4. The method of claim 1 wherein said alphamonoolefin is butene-1.

5. The method of claim 1 wherein said alphamonoolefin is octene-1.

6. The method of claim 1 wherein said alphamonoolefin is dodecene-1.

7. The method of claim 1 wherein said first electron donor is anisole and said second electron donor is ethyl benzoate.

8. The method of claim 1 wherein said magnesium halide is magnesium chloride, said aluminum halide is aluminum trichloride, said first electron donor is anisole, said second electron donor is ethyl benzoale, and said titanium compound is titanium tetrachloride.

9. A method of preparing low density polyethylene having a density of between 0.91 and 0.93 grams per cubic centimeter comprising copolymerizing ethylene with from 1 to 50 percent by weight of an alpha-monoolefin co-monomer having 3 to 20 carbon atoms, said copolymerization being carried out at a temperature between 200° C. and 300° C. at pressures up to 50,000 psig in the presence of
    (a) a catalyst prepared by
        (i) co-comminuting a mixture of an anhydrous magnesium halide, anhydrous aluminum halide and a first electron donor, and
        (ii) co-comminuting the mixture from (i) with a complex of a titanium compound and a second electron donor, which may be different from or the same as said first electron donor; said co-comminuting being carried out under an inert atmosphere in the presence of an inert solvent, and
        (iii) reacting the catalyst from (ii) with and alpha-monoolefin having 4 to to 12 carbon atoms in the presence of an alkyl aluminum to form a soluble polymer on the catalyst, and
    (b) a co-catalyst comprising a synergistic mixture of between 40 to 80 mole percent of an alkyl aluminum chloride and 20 to 60 mole percent of an oxygen-containing aluminum compound selected from the group consisting of aluminum oxide, dialkyl aluminum alkoxide, alkyl aluminum dialkoxide, aluminum trialkoxide, tetraalkyldialuminoxane, pentaalkyltrialuminoxane, and hexaalkyltetraaluminoxane, wherein alkyl may be linear or branched alkyl groups having 1 to 10 carbon atoms in the group.

10. The method of claim 8 wherein said alpha-monoolefin comonomer is butene-1 and said alpha-monoolefin reacted with the catalyst in step (a) (iii) is butene-1.

11. The method of claim 8 wherein said copolymerization is carried out for a time less than 10 minutes.

12. The method of claim 8 wherein said first electron donor is anisole and said second electron donor is ethyl benzoate.

13. The method of claim 8 wherein said co-catalyst consists of a synergistic mixture of between 40 to 80 mole percent of diethyl aluminum chloride and 20 to 60 mole percent of diethyl aluminum ethoxide.

* * * * *